(12) United States Patent
Ogasawara et al.

(10) Patent No.: US 8,100,485 B2
(45) Date of Patent: Jan. 24, 2012

(54) ROTATING DOOR MECHANISM AND ELECTRONIC APPLIANCE

(75) Inventors: Yutaka Ogasawara, Saitama (JP);
Hidetoshi Kawabe, Tokyo (JP);
Kazuhito Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 842 days.

(21) Appl. No.: 11/924,106

(22) Filed: Oct. 25, 2007

(65) Prior Publication Data

US 2008/0184624 A1 Aug. 7, 2008

(30) Foreign Application Priority Data

Dec. 1, 2006 (JP) ................................. 2006-325530

(51) Int. Cl.
*A47B 96/00* (2006.01)
(52) U.S. Cl. ...................................................... 312/294
(58) Field of Classification Search .................. 312/294, 312/223.1, 223.2; 361/679.01, 679.02, 679.4, 361/679.55, 679.56, 679.58, 679.6; 49/40, 49/41; 439/136, 142, 143; 174/50, 53, 57, 174/66, 67
See application file for complete search history.

(56) References Cited

U.S. PATENT DOCUMENTS

| | | | | | |
|---|---|---|---|---|---|
| 1,386,500 | A | * | 8/1921 | Hile | 312/290 |
| 2,214,993 | A | * | 9/1940 | De Witt | 220/525 |
| 2,325,721 | A | * | 8/1943 | Visser | 131/235.1 |
| 2,965,429 | A | * | 12/1960 | Stanger | 312/242 |
| 3,220,791 | A | * | 11/1965 | Pokryfke et al. | 312/242 |
| 3,305,284 | A | * | 2/1967 | Dusterhoft | 312/242 |
| 3,599,371 | A | * | 8/1971 | Barroero | 49/30 |
| 5,135,293 | A | * | 8/1992 | St-Germain et al. | 312/199 |
| 5,701,232 | A | * | 12/1997 | Tang et al. | 361/679.58 |
| 5,738,536 | A | * | 4/1998 | Ohgami et al. | 439/142 |
| 5,793,352 | A | * | 8/1998 | Greenberg et al. | 345/699 |
| 6,523,917 | B2 | * | 2/2003 | Twellmann | 312/238 |
| 6,865,993 | B2 | * | 3/2005 | Bartel et al. | 109/70 |

FOREIGN PATENT DOCUMENTS

JP 2005-303118 10/2005

* cited by examiner

*Primary Examiner* — James O Hansen
(74) *Attorney, Agent, or Firm* — Oblon, Spivak, McClelland, Maier & Neustadt, L.L.P.

(57) ABSTRACT

A rotating door mechanism includes: a front door member having a door panel part having a nearly cylindrical side surface which is opened and closed on a side surface of a cabinet; a base member; and a rotating member, wherein the rotating member is rotatably mounted on the base member, the front door member is movably mounted on the rotating member from a direction of the door front side to a depth direction while the front door member is energized to the door front side, the base member is formed with a guiding part guiding the movement of the front door member, and the door panel part is slid to rotate the rotating member and the front door member is moved with movements in a front/depth direction and in the rotating direction by the rotating member and the guiding part, whereby the door panel part is opened and closed.

10 Claims, 11 Drawing Sheets

ROTATING DOOR MECHANISM AND ELECTRONIC APPLIANCE

CROSS REFERENCES TO RELATED APPLICATIONS

The present invention contains subject matter related to Japanese Patent Application JP 2006-325530 filed in the Japanese Patent Office on Dec. 1, 2006, the entire contents of which being incorporated herein by reference.

BACKGROUND OF THE INVENTION

1. Field of the Invention

The present invention relates to a door mechanism which is opened and closed on the cabinet of various devices to shield and expose structural portions inside the cabinet, particularly to a rotating door mechanism which is opened and closed by rotating operations, and an electronic appliance having the rotating door mechanism.

2. Description of the Related Art

In information processing apparatuses such as a personal computer and electronic appliances such as AV (Audio Visual) devices including a television monitor and a video recorder, a door hides various connector terminals, card slots, and input/output terminals such as operating switches formed on a device cabinet.

Figure 11A:
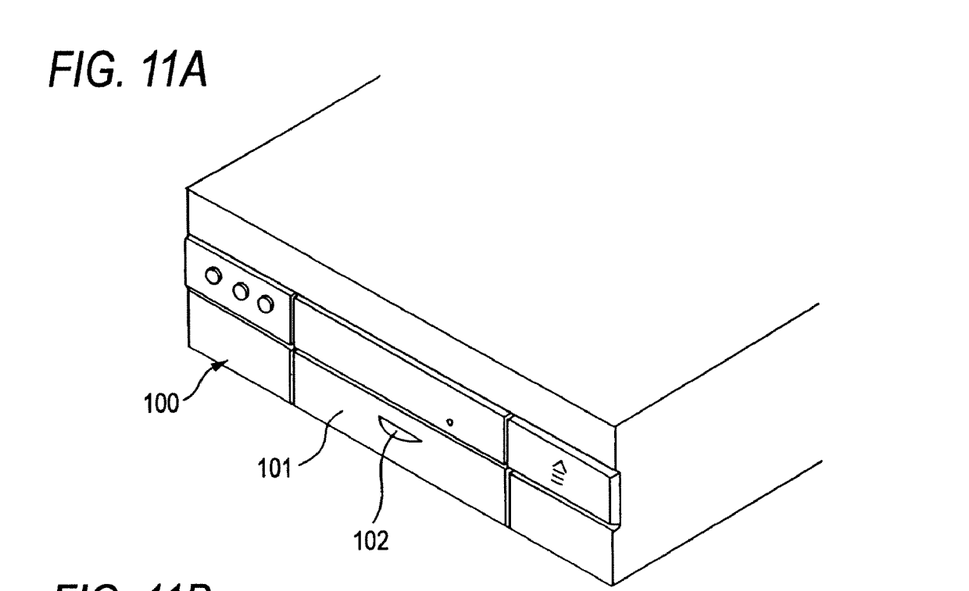
FIGS. 11A and 11B show an illustration depicting a door before.
Figure 11B:
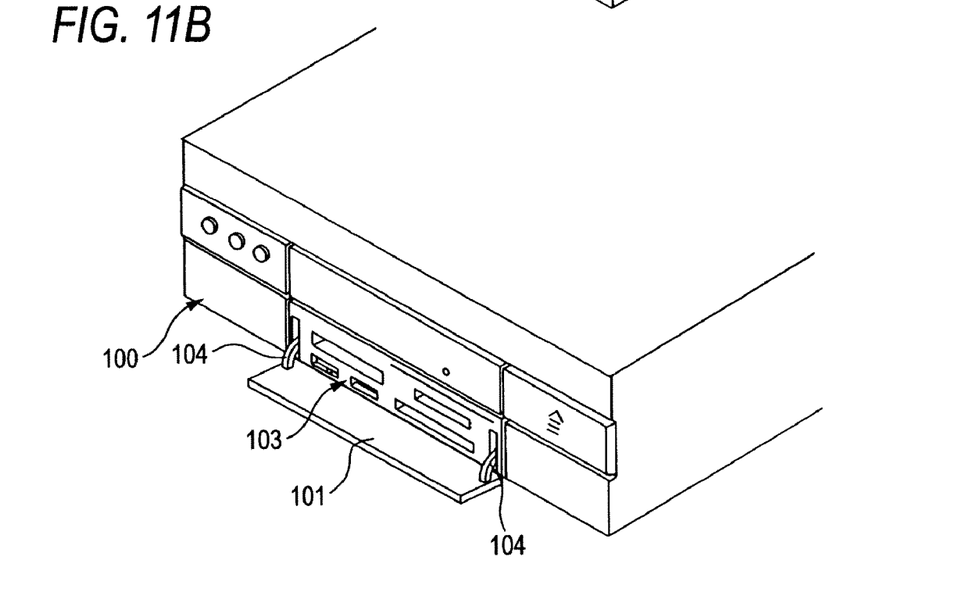

FIGS. 11A and 11B show a device on which a door 101 is formed that is opened and closed on the front side of a cabinet 100. In this example, the door is closed as shown in FIG. 11A, a user pulls a handle 102 with his/her fingers, and the door 101 is rotated and opened so as to fall forward through arms 104 as shown in FIG. 11B. Then, the door is opened to expose an internal mechanism 103 such as connector terminals and card slots.

Moreover, JP-A-2005-303118 (Patent Reference 1) also describes a device in which a door covering a wiring connecting part is rotated forward and opened.

SUMMARY OF THE INVENTION

Figure 1A:
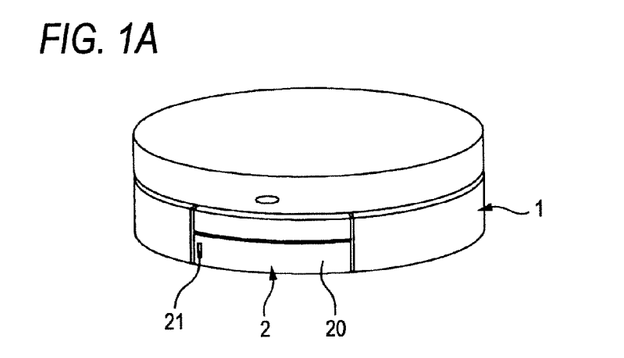
FIGS. 1A to 1C show an illustration depicting a rotating door mechanism according to an embodiment of the invention that is provided on a cabinet.
Figure 1B:
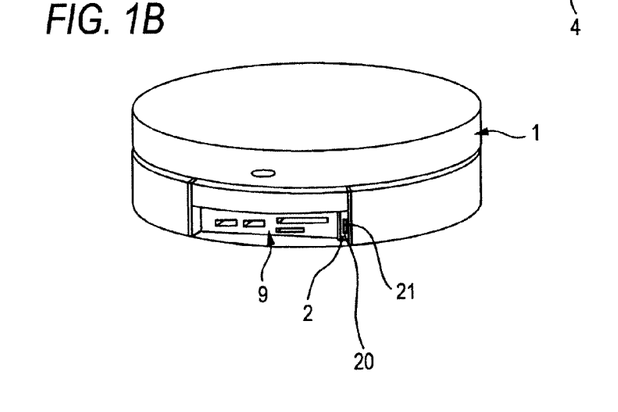
Figure 1C:
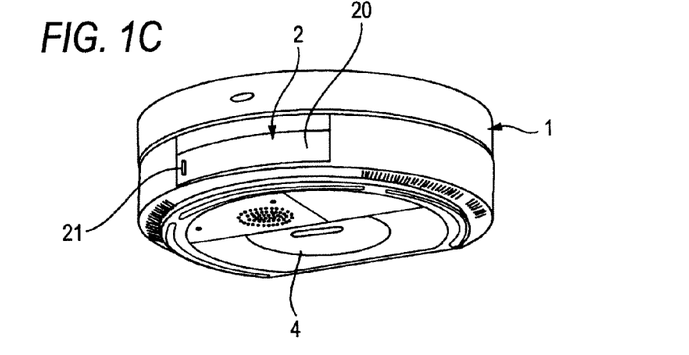

As described above, the door mechanism is general in which a door is rotated and opened so as to fall forward. However, the door mechanism like this is suited to be mounted on a flat portion of the device cabinet, but it is not suited as a door mechanism provided on the curved portion of the side surface of a cylinder. For example, it is not suited as a door mechanism that is mounted on the front side of a cylindrical device cabinet as shown in FIGS. 1A to 1C, described later, that is, a door mechanism to be mounted on the cylindrical side surface thereof.

In other words, when it is intended that the door is opened forward in the portion of the cylindrical side surface, the following disadvantage arises because the cabinet surface has a curved surface.

First, when the arms connecting the door to the cabinet are arranged at the ends of the door, it is necessary to greatly cut the lower portion of the door of the cabinet.

In addition, when the arm connecting the door to the cabinet is arranged at the center part of the door, a door rattle becomes great, which further impairs the appearance.

On the other hand, in addition to the mechanism in which the door is opened so as to fall forward, such a mechanism is known that a door is slid in the lateral direction. However, in the structure in which the door is opened in the lateral direction, the motion of the door is generally defined by a rail or a gear along the path, but it is difficult to provide a smooth feel of the open/close operation with the rail or the gear. In addition, in the state of the door closed, the door surface is positioned at one step back from the cabinet having the cylindrical side surface, which restricts the design.

Thus, it is desirable to implement a rotating door mechanism which is suited to be mounted on the curved surface of the side surface of a cylinder with smooth operations with excellence in design.

A rotating door mechanism according to an embodiment of the invention is a rotating door mechanism including: a front door member having a door panel part having a nearly cylindrical side surface which is opened and closed in a portion of a nearly cylindrical side surface of a cabinet; a base member; and a rotating member.

The rotating member is rotatably mounted on the base member, the front door member is movably mounted on the rotating member from a direction of the door front side to a depth direction while the front door member is energized in the direction of the door front side, and the base member is formed with a guiding part which is abutted against a guided part formed on the front door member and guides the movement of the front door member. The door panel part is slid in a direction of rotating the rotating member to rotate the rotating member, and the front door member is moved in association with movements in a front/depth direction and in the rotating direction by the rotation of the rotating member and the guide of the guiding part, whereby the door panel part is opened and closed.

Moreover, the movement of the front door member in association with the movements in the front/depth direction and in the rotating direction in opening the closed door is a movement that the front door member is rotated together with the rotating member by a thrust in sliding applied to the door panel part while the front door member is moved in the depth direction against energization by the rotating member.

In addition, the movement of the front door member in association with the movements in the front/depth direction and in the rotating direction in closing the opened door is a movement that the front door member is rotated together with the rotating member by the slide applied to the door panel part as well as the front door member is pushed out in the direction of the door front side due to energization by the rotating member.

In addition, a movable spring is mounted between the rotating member and the base member, and the movable spring is mounted so as to energize the rotating member to be positioned in a rotating direction from an intermediate position to a position of the door opened and in a rotating direction from an intermediate position to a position of the door closed with respect to the base member.

In addition, an electronic appliance according to an embodiment of the invention is an electronic appliance having the rotating door mechanism above.

The embodiments of the invention includes a mechanism in which for a door arranged on a cabinet having a nearly cylindrical side surface, a drawing mechanism and a rotating mechanism are combined to allow the door to be opened and closed in rotation, as the door is slide in the lateral direction and the door is drawn inside in opening, whereas the door panel part is pushed out in the front direction in closing.

Opening and closing the door at the portion on the nearly cylindrical side surface of the cabinet means that the rotation of the rotating member directly leads to the open/close operation of the front door member. More specifically, the rotating member is rotated with respect to the base member to open and close the front door member mounted on the rotating member.

In opening and closing the door, a user laterally slides the door panel part of the front door member, and the sliding also causes the rotating member to be rotated together with the front door member.

Since the front door member is energized in the front direction, the door panel part is excellently positioned on the nearly cylindrical side surface of the device cabinet in the state of the door closed because the door panel part similarly has a nearly cylindrical side surface.

In opening the door, a thrust applied to the door panel part by a user in sliding the door to rotate the front door member together with the rotating member to open the door while the front door member is moved in the depth direction against energization by the rotating member.

According to the embodiments of the invention, such advantages are exerted that the door panel part can be arranged excellently on the curved surface of the side surface of a product having a nearly cylindrical shape, which is preferable in design, and that the door is slid only in the lateral direction to be opened and closed. In other words, since the mechanism is a mechanism that the door panel part is rotated as it enters in the depth direction, the mechanism has almost no influence on the appearance, although the mechanism is the door mechanism in which the door is opened and closed by sliding it in the lateral direction.

In addition, the movable spring energizes the rotating member to be positioned in a rotating direction from an intermediate position to a position of the door opened and in a rotating direction from an intermediate position to a position of the door closed with respect to the base member. Thus, in sliding the door in the lateral direction by a user, the user only move the door to nearly the half of the open/close range, and then the door is automatically opened (or closed). Accordingly, the open/close operation can be performed more smoothly.

DETAILED DESCRIPTION OF THE INVENTION

An embodiment of the invention will be described with reference to FIGS. 1A to 10.

FIGS. 1A to 1C show a cylindrical device cabinet 1 as an exemplary cabinet of an electronic appliance, showing the state in which a rotating door mechanism according to the embodiment is formed on the front side of the cylindrical device cabinet, that is, on the side surface of a cylinder. FIG. 1A shows a perspective view depicting the state of door closed, FIG. 1B shows a perspective view depicting the state of the door opened, and FIG. 1C shows a perspective view depicting the cabinet 1 seen from below.

The rotating door mechanism is configured to have a front door 2 with a door panel part 20 that actually shields and exposes an internal mechanism 9 including connector terminals and card slots as shown in FIGS. 1A and 1B, a bottom plate 4 shown in FIG. 1C, and a rotating plate 3, described later, not shown in FIGS. 1A to 1C.

The front door 2, the rotating plate 3, and the bottom plate 4 are examples of a front door member, a rotating member, and a base member, respectively.

The door panel part 20 has a curved front surface having the same curvature as that of the cylindrical side surface of the cabinet 1, and the door panel part 20 partially forms the cylindrical side surface of the cabinet in the state of the door closed as shown in FIG. 1A. More specifically, the door panel part 20 is pushed flush with the side surface of the cabinet 1.

In opening the closed door as shown in FIG. 1A, a user places his/her finger near a slide guide rib 21 formed in a small projecting shape on the front surface of the door panel part 20, and slides the door panel part 20 in the right direction in the drawing.

Then, the door panel part 20 (the front door 2) is slid in the lateral direction (in the direction of the circumference of a circle along the cylindrical side surface) while it is moved in the depth direction, and the door is opened as shown in FIG. 1B. In the state of the door opened, the door panel part 20 is positioned more on the inner side than the side surface of the cabinet as shown in the drawing.

As described above, in opening the closed door, first, a user places his/her finger to apply a natural thrust, which applies a force to the door panel part 20 to move in the depth direction. The front door 2 is rotated by slide movement to open the door. For the user, the door can be opened with a simple, light slide of the door panel part 20 in the right direction.

In addition, in closing the opened door as shown in FIG. 1B, a user places his/her finger near the slide guide rib 21 projecting forward from the cabinet, and slides the door panel part 20 in the left direction.

Then, the door panel part 20 (the front door 2) is slid in the lateral direction (in the direction of the circumference of a circle along the cylindrical side surface), and the door is opened as shown in FIG. 1A. At this time, since the front door 2 is energized forward, the door 2 is moved while it is pushed forward in reverse when opened.

More specifically, in closing the door, the front door 2 is rotated as well as pushed forward with a slide operation by a user and a forward energizing force, and the door is brought at the position of the door closed as shown in FIG. 1A. For the user, the door can be closed with a simple, light slide of the door panel part 20 in the left direction.

The rotation of the front door 2 in association with the movement in the front/depth direction as described above can be implemented by a mechanism incorporated in the bottom plate 4 shown in FIG. 1C.

The front door 2, the rotating plate 3, and the bottom plate 4 forming the rotating door mechanism doing the operations and the mounting state thereof will be described.

Figure 2A:
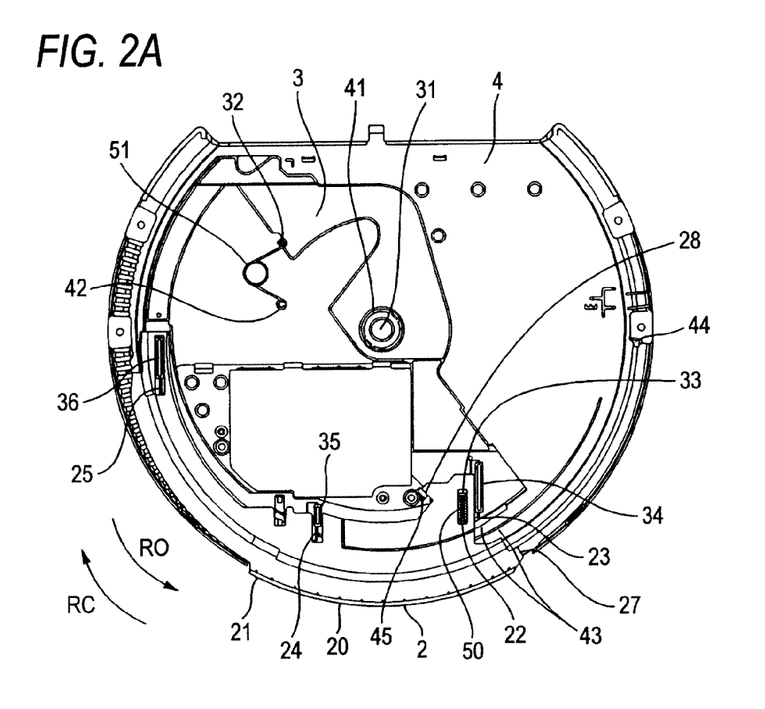
FIGS. 2A and 2B show a plan view and a perspective view depicting the rotating door mechanism according to the embodiment in the state of the door closed.
Figure 2B:
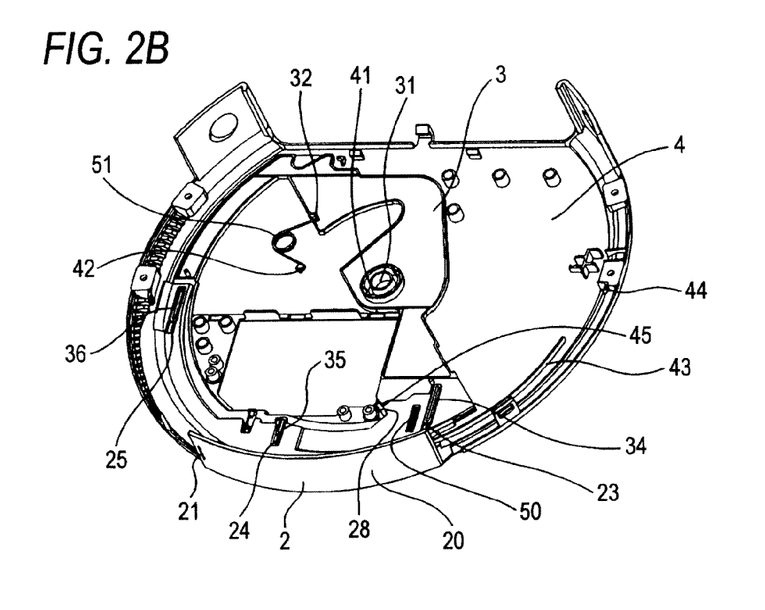

FIGS. 2A and 2B show a plan view and a perspective view depicting the overall rotating door mechanism in which the front door 2 and the rotating plate 3 are mounted on the bottom plate 4. FIGS. 2A and 2B show the state of the door closed.

Figure 3A:
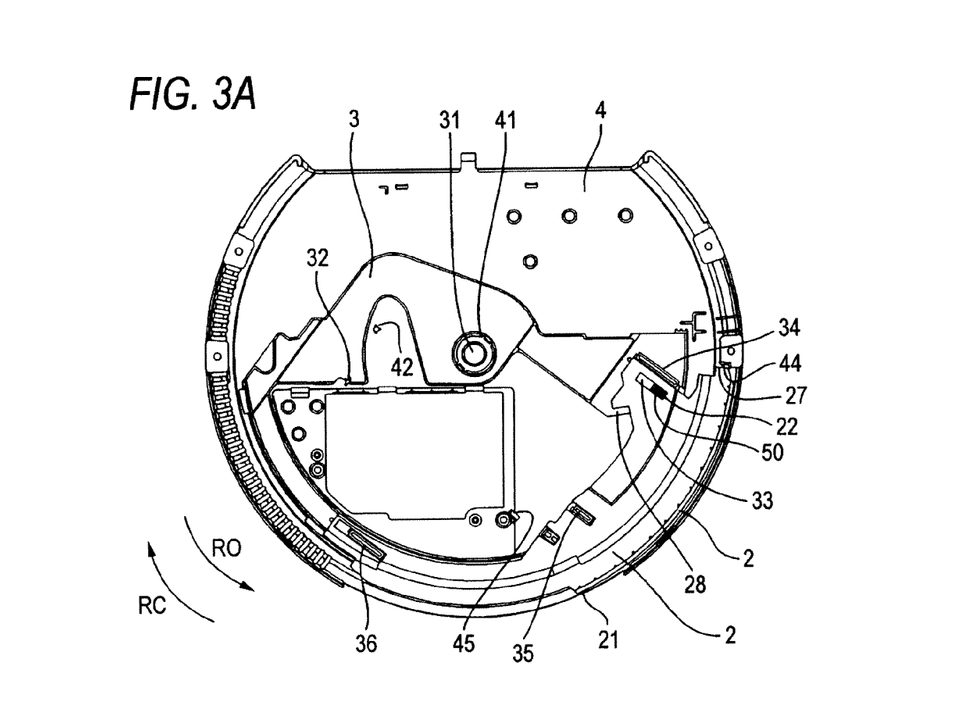
FIGS. 3A and 3B show a plan view and a perspective view depicting the rotating door mechanism according to the embodiment in the state of the door opened.
Figure 3B:
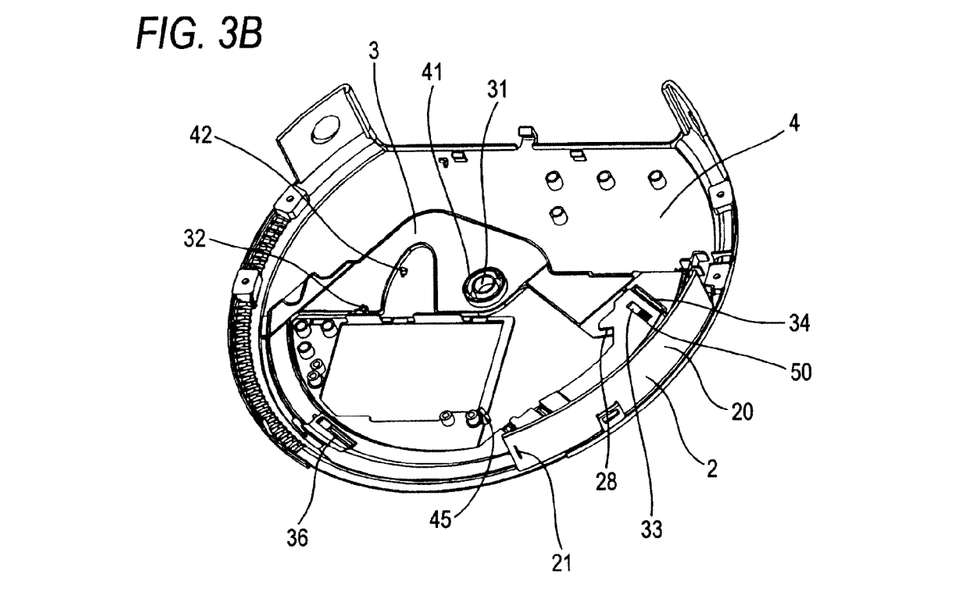

FIGS. 3A and 3B also show a plan view and a perspective view depicting the overall rotating door mechanism in which the front door 2 and the rotating plate 3 are mounted on the bottom plate 4. FIGS. 3A and 3B show the state of the door opened.

FIGS. 4A and 4B, FIGS. 5A to 5D, and FIGS. 6A to 6D show the bottom plate 4, the rotating plate 3, and the front door 2, respectively.

Figure 4A:
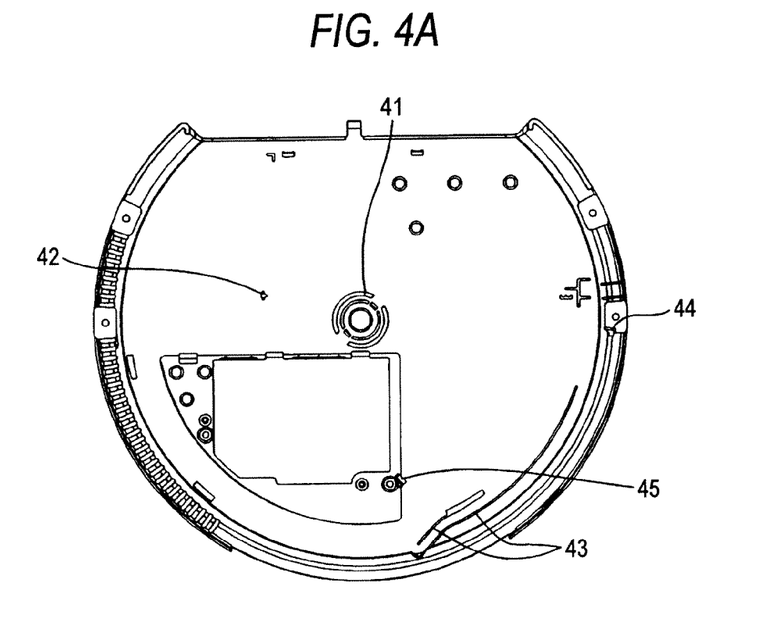
FIGS. 4A and 4B show a plan view and a perspective view depicting a bottom plate according to the embodiment.
Figure 4B:
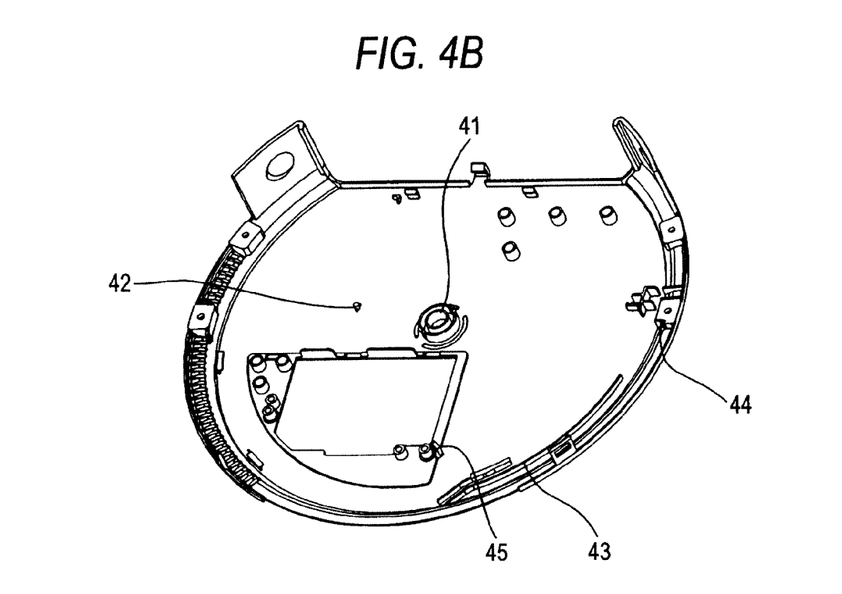
Figure 5A:
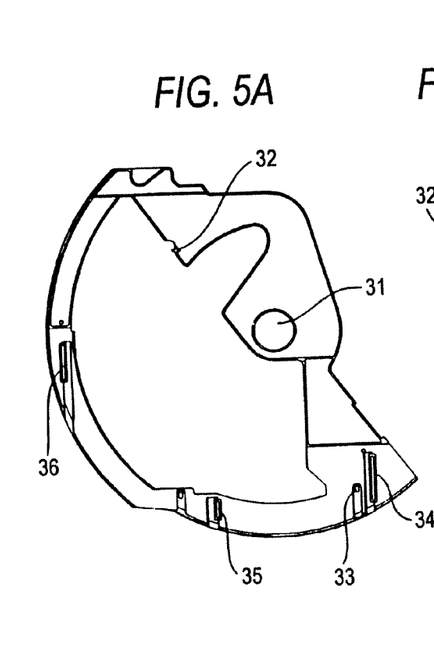
FIGS. 5A to 5D show a plan view, a right side view, a bottom view, and a perspective view depicting a rotating plate according to the embodiment.
Figures 5B, 5C, 5D:
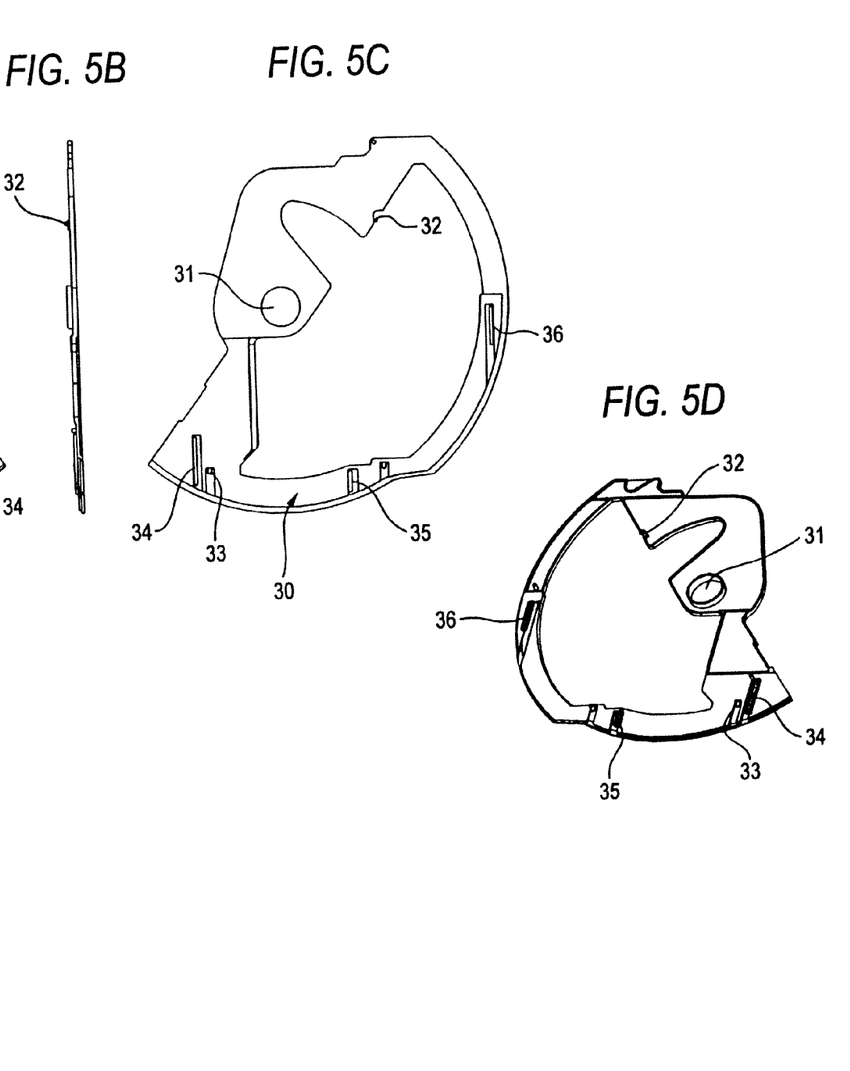
Figure 6A:
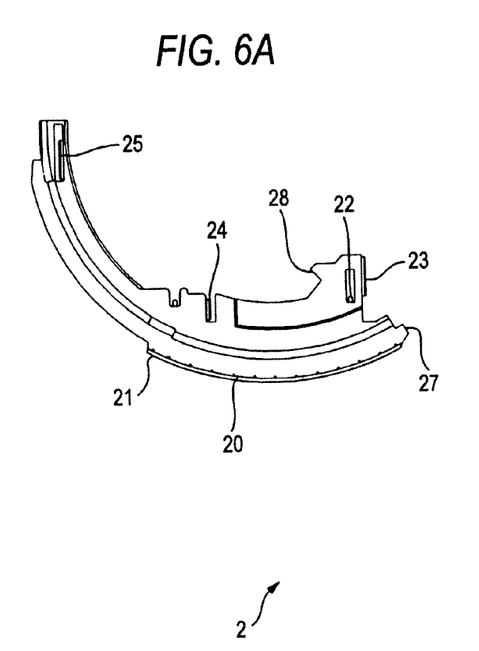
FIGS. 6A to 6D show a plan view, a right side view, a bottom view, and a perspective view depicting a front door according to the embodiment.
Figure 6B:
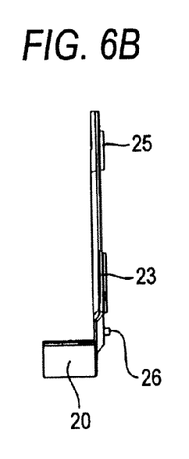
Figure 6C:
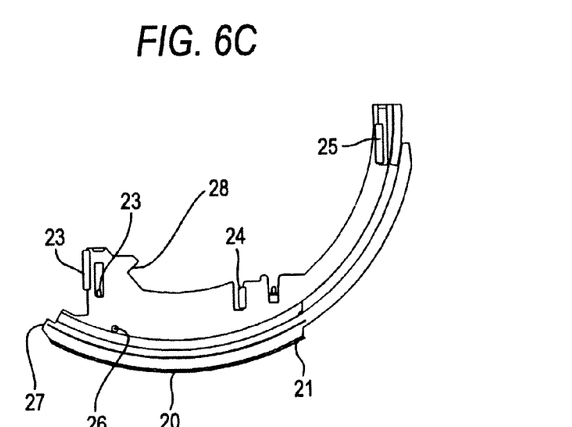
Figure 6D:
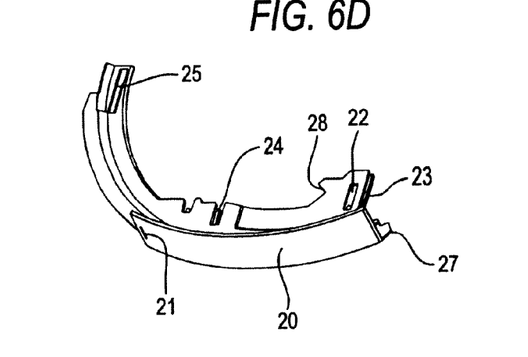
Figure 7A:
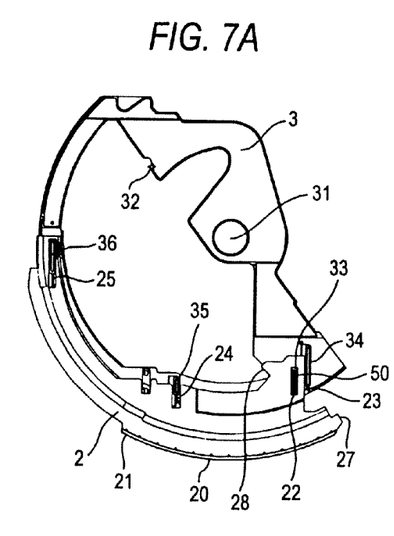
FIGS. 7A to 7D show a plan view, a right side view, a bottom view, and a perspective view depicting the state of the rotating plate mounted on the front door according to the embodiment.
Figures 7B, 7C, 7D:
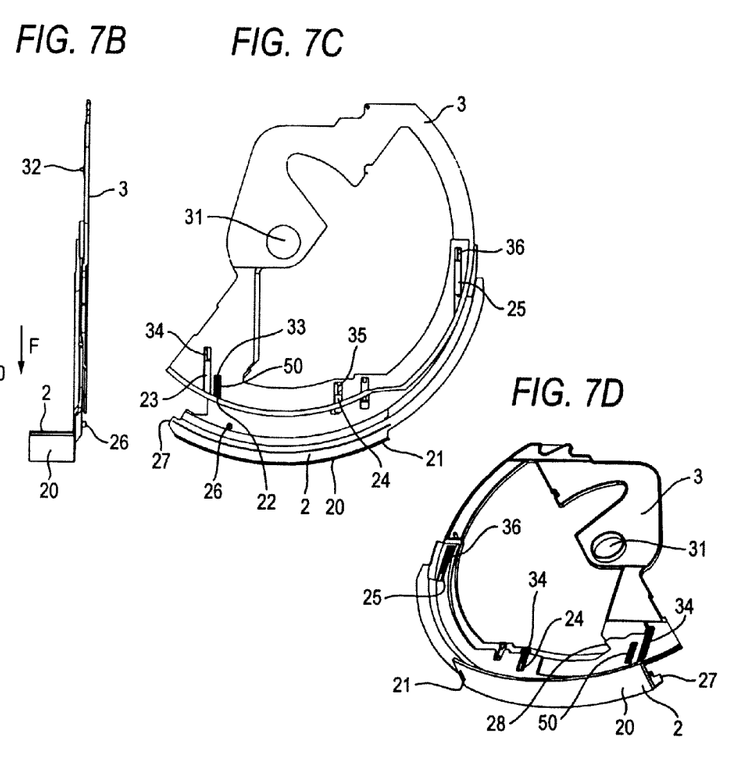

First, the bottom plate 4 will be described in FIGS. 4A and 4B. FIGS. 4A and 4B show a plan view and a perspective view depicting the bottom plate 4.

The bottom plate 4 is formed in a circular flat shape so as to fit in the cylindrical cabinet 1 shown in FIGS. 1a and 1B, and functions as the bottom member of the cabinet 1.

At the center part of the bottom plate 4, a rotating shaft 41 is formed. For example, the rotating shaft 41 is formed as a circular rib.

In addition, near the rotating shaft 41, a spring retain part 42 is formed on which one end of a movable spring 51, described later, is mounted.

In addition, a guide rib 43 is formed in the direction of the circumference of a circle. The guide rib 43 has a function of guiding the movement of the front door 2, which is formed of a long rib outside and a short rib inside.

A stopper 44 is provided to control the front door 2 so as not to rotate more at the time when the door is opened.

On the other hand, the stopper 45 is provided to control the front door 2 so as not to rotate more at the time when the door is closed.

FIGS. 5A, 5B 5C and 5D show a plan view, a right side view, a bottom view, and a perspective view depicting the rotating plate 3 that is rotatably mounted on the bottom plate 4.

A rotation center hole 31 is provided on the rotating plate 3. The rotating plate 3 is mounted on the bottom plate 4 in the state in which the rotation center hole 31 is fit into the rotating shaft 41 of the bottom plate 4.

In addition, a spring retain rib 32 is formed at a predetermined position, on which the other end of the movable spring 51, described later, is mounted.

Moreover, slide engaging parts 34, 35 and 36 are provided as portions on which the front door 2 is mounted, and a spring support part 33 is mounted on which a compressed spring 50 is mounted that energizes the front door 2 in the front direction, described later.

FIGS. 6A, 6B, 6C and 6D show a plan view, a right side view, a bottom view, and a perspective view depicting the front door 2 that is movably mounted on the rotating plate 3 in the front/depth direction.

As shown in the drawing, in the front door 2, the portion positioned more on the inner side in the device cabinet than the door panel part 20 is formed in one piece, on which slide engaging parts 23, 24 and 25 and a spring support part 22 to mount the compressed spring 50 thereon are formed.

In addition, one end of the door panel part 20 is an abutting part 27 that is abutted against the stopper 44 of the bottom plate 4 in the state of the door opened.

In addition, an abutting part 28 is formed that is abutted against the stopper 45 of the bottom plate 4 in the state of the door closed.

Furthermore, on the bottom surface side of the front door 2, a boss 26 is provided to be a guided part which is guided by the guide rib 43 of the bottom plate 4.

FIGS. 7A, 7B, 7C and 7D show a plan view, a right side view, a bottom view, and a perspective view depicting the state in which the front door 2 is mounted on the rotating plate 3.

As shown in the drawings, the slide engaging parts 23, 24 and 25 of the front door 2 are engaged with the slide engaging parts 34, 35 and 36 of the rotating plate 3, respectively, whereby the front door 2 is movably mounted on the rotating plate 3 in the front/depth direction. In addition, the movable range in the front/depth direction is decided in accordance with the movable range of the slide engaging parts 23, 24 and 25 of the front door 2 with respect to the slide engaging parts 34, 35 and 36 of the rotating plate 3.

Moreover, the compressed spring 50 is mounted between the spring support part 22 of the front door 2 and the spring support part 33 of the rotating plate 3. Thus, the front door 2 is energized from the rotating plate 3 in the front direction (in the drawing, in the direction of an arrow F).

Then, the rotating door mechanism is designed so that the door panel part 20 forms the side surface flush with the cylindrical side surface of the cabinet 1 as shown in FIG. 1A, in the state in which the front door 2 is pushed in the most forward side by the compressed spring 50 within the movable range of the slide engaging parts 23, 24 and 25.

The front door 2 and the rotating plate 3 in FIGS. 7A to 7D are mounted on the bottom plate 4, where by the mechanism is in the states shown in FIGS. 2A and 2B and FIGS. 3A and 3B.

In the state of the door closed as shown in FIGS. 2A and 2B, the front door 2 is energized from the rotating plate 3 in the front direction and positioned to form the side surface of the cabinet with the door panel part 20 and the cabinet 1.

When a user slides the door panel part 20 in this state, the rotating plate 3 is rotated in an RO direction about the rotation center hole 31. In association with that, the front door 2 is rotated in the state as shown in FIGS. 3A and 3B, and then the door is opened. In addition, at the rotated position in the state of the door opened, the abutting part 27 of the front door 2 is abutted against the stopper 44 to control the rotation in the RO direction over this position. At the rotated position in the state of the door opened, the slide guide rib 21 of the door panel part 20 is slightly exposed from the corner of the internal mechanism 9 inside the cabinet as shown in FIG. 1B.

In addition, when a user slides the door panel part 20 in the state of the door opened as shown in FIGS. 3A and 3B, the rotating plate 3 is rotated in the RC direction about the rotation center hole 31. In association with that, the front door 2 is rotated to the state shown in FIGS. 2A and 2B, and then the door is closed. In addition, at the rotated position in the state of the door closed, the abutting part 28 of the front door 2 is abutted against the stopper 45 to control the rotation in the RC direction over the position.

The characteristics in the open/close operation will be described.

Figure 8:
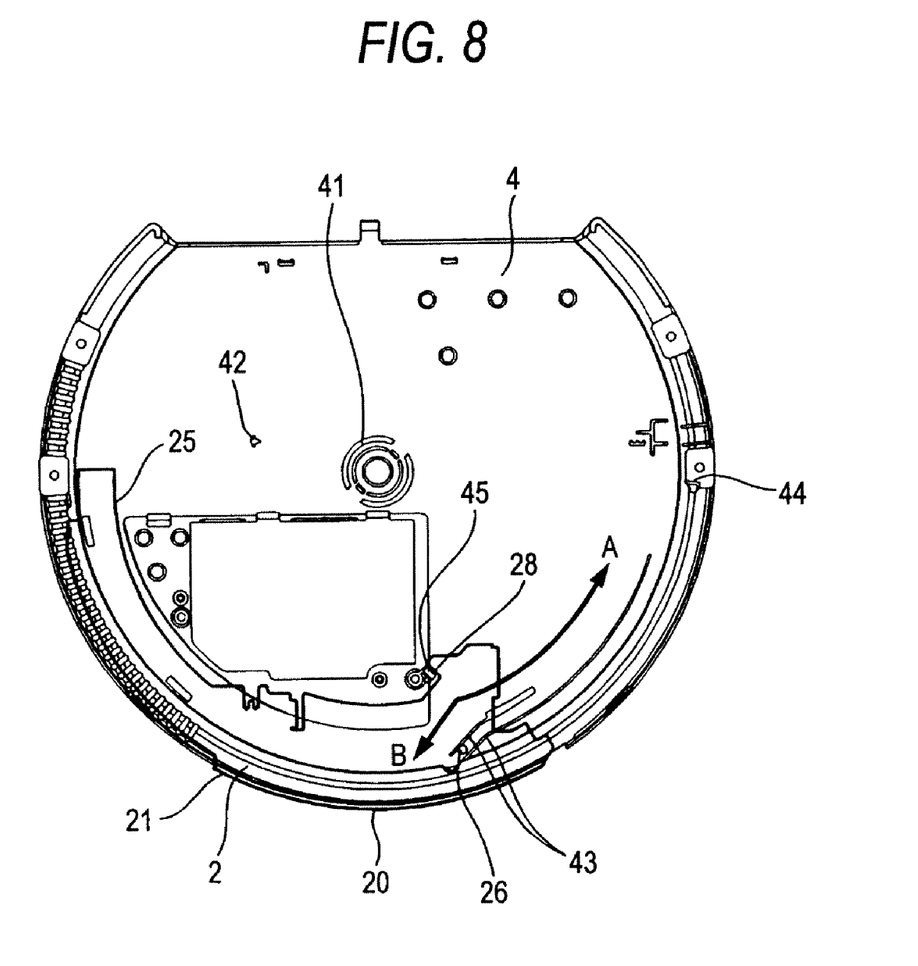
FIG. 8 shows an illustration depicting the position relation between the bottom plate and the front door in the state of the door closed according to the embodiment.
Figure 9:
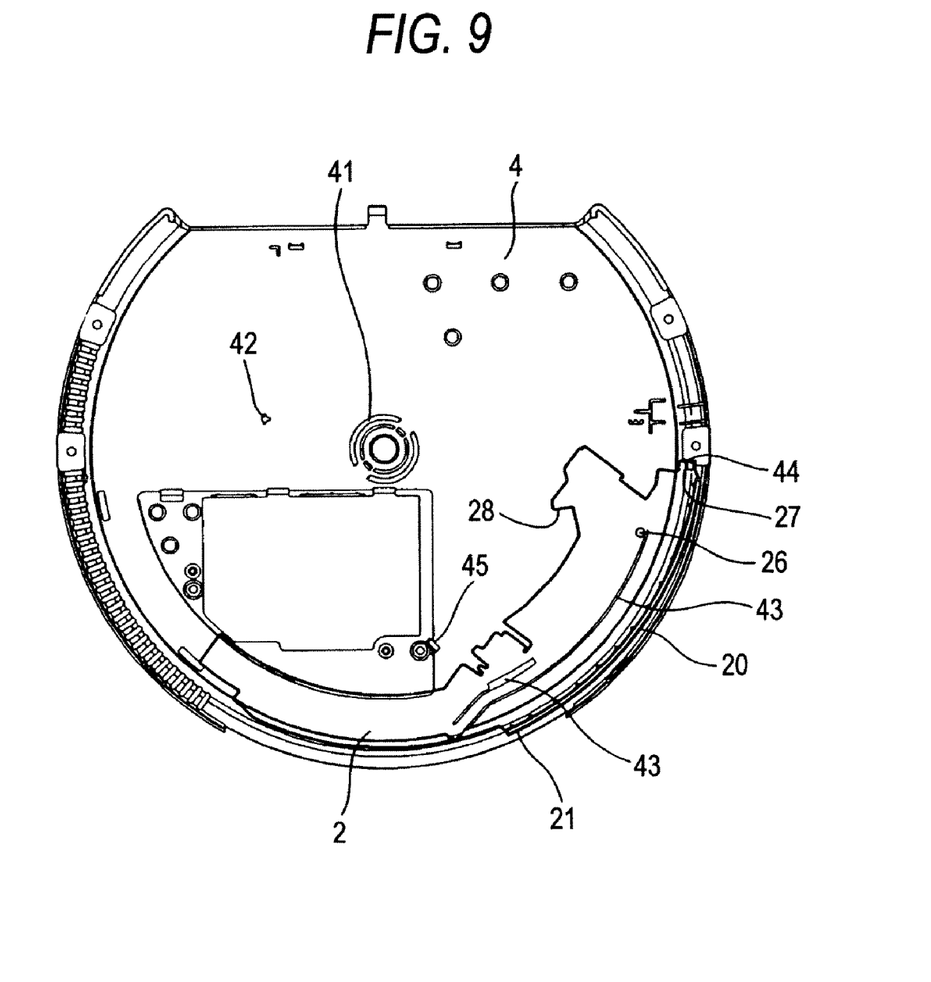
FIG. 9 shows an illustration depicting the position relation between the bottom plate and the front door in the state of the door opened according to the embodiment.

FIGS. 8 and 9 show the position relation between the front door 2 and the bottom plate 4, and the boss 26 formed on the bottom surface of the front door 2 in the states of the door closed and the door opened.

In the example, the front door 2 is moved as shown in a double-headed arrow A-B in FIG. 8. In other words, in opening the door, as the motion in the A direction, the door panel part 20 is closed, the door enters inside in the oblique direction, and then the door is rotated. Moreover, in closing the door, as the motion in the B direction, the door panel part 20 is rotated, and the part 20 is pushed out in the oblique direction while it is rotated. The door panel part 20 is moved in this manner to provide two advantages that the door can be accommodated with little influence on the appearance, and that a user moves the door only in the lateral direction to open and close the door.

In order to implement the motion in which the door panel part 20 enters inside and then rotates in this manner, as described above, the front door 2 is movably mounted on the rotating plate 3 in the front/depth direction, the rotating shaft 41 of the bottom plate 4 is fit into the rotation center hole 31 of the rotating plate 3, and then the rotating plate 3 is movably mounted.

The guide rib 43 of the bottom plate 4 functions as a guide for the motion in which the door panel part 20 enters in the depth direction in opening the closed door, and for the motion in which the door panel part 20 is finally pushed out in the front direction in closing the opened door. In other words, the boss 26 of the front door 2 is guided by the guide rib 43 between the state in FIG. 8 and the state in FIG. 9, whereby the motion of the front door 2 is controlled.

As discussed above, since the front door 2 is always applied with a force to separate the door from the rotating plate 3 in the front direction by means of the compressed spring 50, the front door 2 is opened and closed while the boss 26 is always contacted with the outside guide rib 43 shown in FIGS. 8 and 9.

In the motion other than the motion in which the door panel part 20 enters in the depth direction (or the part 20 is pushed out in the front direction), since the guide rib 43 of the bottom plate 4 has an arc shape having the same center as the rotational center, the front door 2 is moved in the rotational motion.

The compressed spring 50 is mounted so that the door panel part 20 is reliably, automatically moved and pushed in the front direction when closed. Suppose the compressed spring 50 is not provided, such an event occurs that the guide rib 43 makes a resistance and the door is not completely closed in closing the door. However, the compressed spring 50 is mounted to allow the door panel part 20 to be smoothly moved to the position at which the door is closed.

Moreover, in closing the door panel part 20, a user might press the door panel part 20 with his/her finger to prevent the door from being pushed out in the front direction while the user slides the door. However, the energizing force of the compressed spring 50 naturally pushes the door panel part 20 out in the front direction at the point in time when the finger is off the door.

In addition, in the example, a torsion spring is mounted between the bottom plate 4 and the rotating plate 3 as the movable spring 51, which implements smooth rotating operations.

Figure 10:
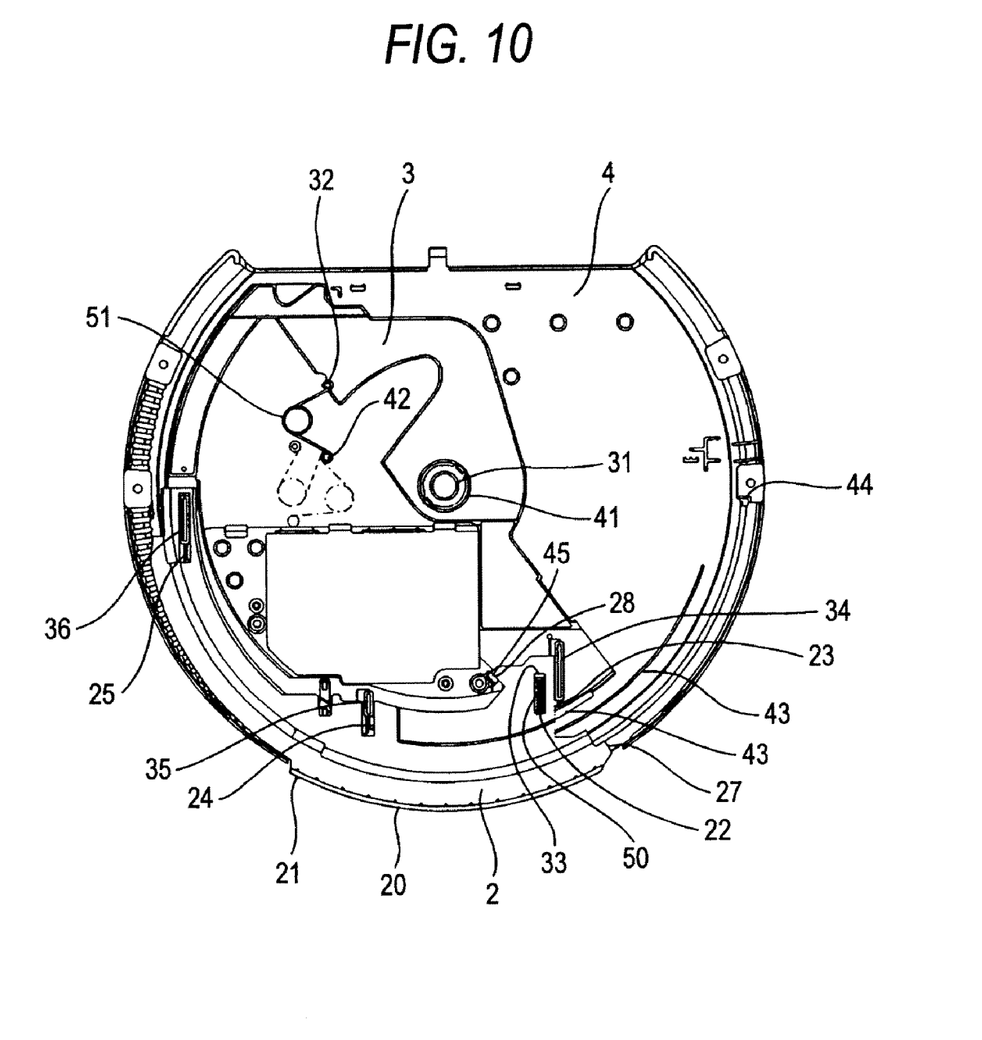
FIG. 10 shows an illustration depicting the operation of a movable spring according to the embodiment.

FIG. 10 shows the movable spring 51 that is mounted between the spring retain part 42 of the bottom plate 4 and the spring retain part 32 of the rotating plate 3 in the state of the door closed. Particularly, the states of the movable spring 51 are depicted by a broken line and a chain line in which the rotating plate 3 is rotated to open the door. More specifically, it is the state of the movable spring 51 which responds to the change in the position of the spring retain part 32 on the rotating plate 3 caused by the rotation about the rotation center hole 31. The chain line depicts the state of the movable spring 51 in the state of the door opened (the position relation between the spring retain parts 42 and 32 is in the states as shown in FIGS. 3A and 3B).

In addition, a broken line depicts the state of the movable spring 51 at the rotated position in which the rotating plate 3 is an intermediate position between the state of the door closed and the state of the door opened. Particularly, the state depicted by the broken line at the intermediate position in rotation is the state in which both arms of the movable spring 51 are most compressed (the switching point of the spring).

The switching point of the movable spring 51 is provided at almost the middle of the rotation range of the state in which the door panel part 20 is closed and the state in which the part 20 is completely opened. In other words, the movable spring 51 energizes the rotating plate 3 from the intermediate position in rotation to the rotated position in the state of the door opened, and energizes it from the intermediate position in rotation to the rotated position in the state of the door closed. Therefore, in opening the closed door, a user slides the door panel part 20 to the position between the intermediate position and the position at which the door is completely opened, and then the movable spring 51 is operated from the state depicted by the broken line to the state depicted by the chain line shown in FIG. 10 to naturally rotate the rotating plate 3 to the rotated position at which the door is fully opened. In addition, contrary to this, in closing the opened door, a user slides the door panel part 20 to the position between the intermediate position and the position at which the door is completely closed, and then the movable spring 51 is operated from the state depicted by the broken line to the state depicted by a solid line shown in FIG. 10 to naturally rotate the rotating plate 3 to the rotated position at which the door is closed. Accordingly, the user only moves the door to almost the middle of the range of opening and closing the door both in opening and closing the door, and after that the door automatically reaches the desired state even though his/her finger is off the door, which allows the door to operate very smoothly.

Moreover, since the movable spring 51 energizes the rotating plate 3 at the rotated position in the state of the door closed and the rotated position in the state of the door opened, the spring 51 and the plate 3 are maintained with no unnecessary rotations when they are in the state of the door closed as shown in FIG. 1A and in the state of the door opened as shown in FIG. 1B.

In addition, as discussed above, the compressed spring 50 is mounted in order to assist the door panel part 20 to go outside in finally closing the door. The strengths of two springs are set so that the front door 2 is automatically rotated even though the compressed spring 50 has resistance caused by the torque of the movable spring 51 (the torsion spring).

In accordance with the rotating door mechanism according to the embodiment, a door can be mounted without impairing the appearance of products in providing the door on the cylindrical side surface of various devices.

Particularly, in order to keep the appearance of a cylinder beautiful in making a part of the cylindrical cabinet a door, it is necessary to rotate the door panel part 20 as well as to move the part 20 inside. Moreover, such operations are preferable for a user that the user only slides the door panel part 20 in the lateral direction to automatically move the door inside and the user laterally slides it to push the door outside in closing the door, not two step operations in which a user pushes the door panel part 20 and then slides it in the lateral direction. These operations are implemented in the example. More specifically, for the user, a single operation allows opening/closing the door and drawing/pushing the door at the same time.

In addition, these operations are smoothly performed by the strengths of the compressed spring 50 and the movable spring 51.

As discussed above, the embodiment has been described. The rotating door mechanism according to the embodiment of the invention can be adapted to various devices. For example, it can be considered that the cylindrical cabinet as shown in FIGS. 1A to 1C is adopted to information devices such as a personal computer and AV devices and also adopted to a household electric appliance such as a rice cooker. The rotating door mechanism according to the embodiment of the invention is preferable for the door provided on the cylindrical cabinet thereof.

In addition, the rotating door mechanism according to the embodiment of the invention is preferable not only for electric products but also for cylindrical wooden furniture and resin furniture.

Moreover, the embodiment of the invention is preferable as the door provided on a product partially having the cylindrical side surface in addition to the device having the overall cabinet in a cylindrical shape.

It should be understood by those skilled in the art that various modifications, combinations, sub-combinations and alterations may occur depending on design requirements and other factors insofar as they are within the scope of the appended claims or the equivalents thereof.

What is claimed is:

1. A rotating door mechanism, comprising:
a front door member having
a door panel part having a nearly cylindrical side surface which is opened and closed in a portion of a nearly cylindrical side surface of a cabinet;
a base member having a rotating shaft projecting from the base member; and
a rotating member having
a rotation center hole fit into the rotating shaft of the base member, wherein the rotating member is rotatably mounted on the base member,
the front door member is movably mounted on the rotating member from a direction toward the rotating shaft while the front door member is energized in a direction from the rotating shaft, the base member is formed with a rib which is abutted against a boss formed on the front door member and guides a movement of the front door member obliquely toward the rotating shaft, and, when the door panel part is slid in a direction of rotating the rotating member about the rotation center hole, the front door member is moved on the rotating member toward the rotation center hole and is moved in a rotating direction by a rotation of the rotating member and a guiding of the rib, whereby the door panel part is opened and closed.

2. The rotating door mechanism according to claim 1, wherein the movement of the front door member in opening the door panel part when closed is a movement that the front door member is rotated together with the rotating member by a sliding applied to the door panel part while the front door member is moved toward the rotating shaft against an energization by the rotating member.

3. The rotating door mechanism according to claim 1, wherein the movement of the front door member in closing the door panel part when opened is a movement that the front door member is rotated together with the rotating member by a slide applied to the door panel part as well as the front door member is pushed out from the rotating shaft due to an energization by the rotating member.

4. The rotating door mechanism according to claim 1, wherein the front door member includes a first slide engaging part extending toward the rotating shaft, the rotating member includes a second slide engaging part extending toward the rotating shaft, and the first slide engaging part engages with the second slide engaging part.

5. The rotating door mechanism according to claim 1, wherein the rib projects from the base member.

6. The rotating door mechanism according to claim 1, wherein the base member has a spring retain part mounting a torsion spring, the rotating member has a spring support part mounting the torsion spring, and, when the door panel part is slid in the direction of rotating the rotating member about the rotation center hole, the spring retain part of the rotating member and the torsion spring rotate about the spring retain part of the base member.

7. The rotating door mechanism according to claim 1, wherein the front door member has a spring support part mounting a spring, the rotating member has a spring support part mounting the spring, and the front door member is movably mounted on the rotating member toward the rotating shaft while the front door member is energized in the direction from the rotating shaft by the spring.

8. The rotating door mechanism according to claim 1, wherein an inner rib of the rib is closer to the rotating shaft than is the boss.

9. A rotating door mechanism, comprising:
a front door member having a door panel part having a nearly cylindrical side surface which is opened and closed in a portion of a nearly cylindrical side surface of a cabinet;
a base member; and
a rotating member, wherein the rotating member is rotatably mounted on the base member,
the front door member is movably mounted on the rotating member from a direction of a door front side to a depth direction while the front door member is energized in the direction of the door front side,
the base member is formed with a guiding part which is abutted against a guided part formed on the front door member and guides a movement of the front door member,
the door panel part is slid in a direction of rotating the rotating member to rotate the rotating member, and the front door member is moved in association with movements in a front/depth direction and in a rotating direction by a rotation of the rotating member and a guiding of the guiding part, whereby the door panel part is opened and closed,
a movable spring is mounted between the rotating member and the base member, and
the movable spring is mounted to energize the rotating member to be positioned in a rotating direction from an intermediate position to a position of the door panel part being opened and in a rotating direction from an intermediate position to a position of the door panel part being closed with respect to the base member.

10. An electronic appliance, comprising:
a rotating door mechanism, the rotating door mechanism having
a front door member having a door panel part having a nearly cylindrical side surface which is opened and closed in a portion of a nearly cylindrical side surface of a cabinet;

a base member having a rotating shaft projecting from the base member; and a rotating member having a rotation center hole fit into the rotating shaft of the base member, wherein the rotating member is rotatably mounted on the base member, the front door member is movably mounted on the rotating member from a direction toward the rotating shaft while the front door member is energized in a direction from the rotating shaft, the base member is formed with a rib which is abutted against a boss formed on the front door member and guides a movement of the front door member obliquely toward the rotating shaft, and, when the door panel part is slid in a direction of rotating the rotating member about the rotation center hole, the front door member is moved on the rotating member toward the rotation center hole and is moved in a rotating direction by the rotation of a rotating member and a guiding of the rib, whereby the door panel part is opened and closed.

* * * * *